(12) United States Patent
Cheah et al.

(10) Patent No.: US 10,236,990 B2
(45) Date of Patent: Mar. 19, 2019

(54) ADDING A KEYPAD TO A DEVICE CONFIGURED WITH A WIRELESS RECEIVER

(71) Applicant: INTERDIGITAL CE PATENT HOLDINGS, Paris (FR)

(72) Inventors: Sin Hui Cheah, Carmel, IN (US); Gerald Adolph Colman, Indianapolis, IN (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/512,138

(22) PCT Filed: Sep. 1, 2015

(86) PCT No.: PCT/US2015/047864
§ 371 (c)(1),
(2) Date: Mar. 17, 2017

(87) PCT Pub. No.: WO2016/043964
PCT Pub. Date: Mar. 24, 2016

(65) Prior Publication Data
US 2017/0294969 A1 Oct. 12, 2017

Related U.S. Application Data

(60) Provisional application No. 62/051,967, filed on Sep. 18, 2014.

(51) Int. Cl.
*H04B 10/54* (2013.01)
*G08C 19/00* (2006.01)
*G08C 17/02* (2006.01)
*G08C 23/04* (2006.01)

(52) U.S. Cl.
CPC .......... *H04B 10/541* (2013.01); *G08C 17/02* (2013.01); *G08C 19/00* (2013.01); *G08C 23/04* (2013.01);
(Continued)

(58) Field of Classification Search
CPC ............... G08C 17/02; G08C 2201/30; G08C 2201/33; G08C 23/04; G08C 2201/71;
(Continued)

(56) References Cited

U.S. PATENT DOCUMENTS 4,845,755 A * 7/1989 Busch .................. H04R 25/554
381/315
8,400,344 B2 3/2013 Reams
(Continued)

FOREIGN PATENT DOCUMENTS

DE 4214821 11/1992
EP 0091619 10/1983
(Continued)

OTHER PUBLICATIONS

Anonymous, "Circuit Description of the IR Receiver Modules", Document No. 80069, Vishay Semiconductors, www.vishay.com/doc?91000/, Rev. 1.6, Feb. 27, 2013, pp. 1-2.

Primary Examiner — Dionne H Pendleton
(74) Attorney, Agent, or Firm — Jeffrey M. Navon

(57) ABSTRACT

A device including a remote control of remote operation of the device is described. The remote control includes a key matrix and a microprocessor. The microprocessor processes key scan codes from the key matrix and converts the key scan codes to amplitude modulated remote control commands for transmission by a wireless transmitter. The device includes components so that a user can operate the device locally without a remote control. The components in the device that enable local operation of the device are comparable to components in the remote control that enable remote operation of the device so that a minimum of changes are required in the device to enable local operation of the device.

10 Claims, 5 Drawing Sheets

(52) U.S. Cl.
CPC ..... *G08C 2201/30* (2013.01); *G08C 2201/33* (2013.01)

(58) Field of Classification Search
CPC ......... H04B 10/541; H04N 2005/4407; H04N 2005/4421; H04N 2005/443; H04N 21/42207; H04N 21/42215; H04N 21/42218; H04N 21/42222; H04N 21/4312; H04N 21/4316; H04N 21/4882; H04N 5/4403; H04R 25/554; H04R 25/558
See application file for complete search history.

(56) References Cited

U.S. PATENT DOCUMENTS

| | | | | |
|---|---|---|---|---|
| 2006/0085579 | A1* | 4/2006 | Sato | G08C 17/02 710/73 |
| 2013/0057765 | A1* | 3/2013 | Zeleznikar | H04N 21/42207 348/570 |
| 2013/0177318 | A1* | 7/2013 | Jubilo | G08C 23/04 398/106 |
| 2014/0111315 | A1* | 4/2014 | Geerlings | G07C 9/00309 340/12.5 |
| 2014/0375274 | A1* | 12/2014 | Tsai | H04L 12/10 320/137 |

FOREIGN PATENT DOCUMENTS

| | | |
|---|---|---|
| EP | 0869422 | 10/1998 |
| EP | 0971078 | 1/2000 |
| EP | 1862888 | 12/2007 |
| WO | WO9945692 | 9/1999 |
| WO | WO0173720 | 10/2001 |

* cited by examiner

ADDING A KEYPAD TO A DEVICE CONFIGURED WITH A WIRELESS RECEIVER

This application claims the benefit, under 35 U.S.C. § 365 of International Application PCT/US2015/047864, filed 1 Sep. 2015, which was published in accordance with PCT Article 21(2) on 24 Mar. 2016, in English, and which claims the benefit of U.S. Provisional Application No. 62/051,967, filed 18 Sep. 2014.

BACKGROUND

Most modern consumer electronic devices like television sets, television receivers (e.g., set-top boxes), DVD players, audio receivers, and often include a remote control device that allows a user to operate a device remotely, usually within line of sight of the device. The most common type of remote control device uses an Infrared (IR) signal to transmit commands to the consumer electronic device. Other wireless bands, however, may be used to transmit input commands to a consumer electronic device. For example, Radio Frequency (RF) bands are another option for transmitting input commands to the device and often work even when not in line of sight of a device. A remote control device is used to issue or input commands, from a distance, to a consumer electronic device. The remote control device is typically a hand-held device, and it allows a user to input commands such as changing a channel on a television or television set-top box, as well as adjusting the volume and menu options. An IR remote control device typically transmits a signal, which consists of pulses of infrared light, which is light invisible to the human eye. Most modern IR remote control devices use Amplitude Modulation On-Off Keying (OOK). Many RF remote control devices also use OOK for remote control applications as well. For for example, various automobiles include a key ring equipped with an RF transmitter that use OOK to lock/unlock doors and set/disable an alarm system.

The first television IR remote control device was introduced in the 1950s, primarily with high-end television units. When the IR remote control device was introduced decades ago, it was a convenience accessory that supplemented the control panel of a consumer electronic device. At the time the IR remote control device was initially introduced, the IR remote control device provided the ability to remotely input all or a subset of the input functions physically located on the consumer electronic device. As these IR remote control devices became more common, consumers expected a remote control as standard equipment with their television or set-top box. With the proliferation of IR remote control devices, manufactures of consumer electronic devices began to include a remote control with many other products. Over time, whether a result of cost savings or for a more appealing design, the keys or buttons used to enter input commands that were typically found on the consumer electronic device began to disappear from the device itself; and currently, for many devices, the inputs are now available only on a remote control device.

An example of a modern consumer electronic device that operates with a remote control device, but does not include an option to input commands directly at the consumer electronic device, is a cable or satellite receiver set-top box. A set-top box is an electronic consumer device, which may contain a TV-tuner for receiving an external signal and converting the external signal content to a format compatible with a television. The external signal delivers content to the set-top box and is often provided by a cable television/internet provider or satellite television/internet provider. With a device like such as set-top box, if a user misplaces the remote control device, if the remote control device is damaged or if the batteries become depleted, the user loses some or all ability to operate the device. Consequently, what was once a convenience feature, a remote control device has become a source of frustration for many users. Accordingly, users are now demanding that their consumer electronic device include the option to input commands directly at the consumer electronic device.

Manufactures of these consumer electronic products are now forced to add an option to their product that allows a user to input commands directly at the device. Adding a keypad that provides all or some of the input functionality now incorporated in a remote control device may include extra design and production costs such as: the need to redesign the Printed Circuit Board (PCB), add a front panel controller, modify the key scan code and develop software. These modifications and changes may add size to the PCB, add size to and change the form factor of the consumer device, and add development time and cost. In the competitive consumer electronic device market, increased cost and time to market are detrimental to a products success.

Accordingly, there is a need for a low cost low effort method and device to add a keypad to a consumer electronic device configured with a wireless receiver.

SUMMARY

The example embodiments of the present principles provide methods and apparatuses electrically coupling a low pass filter to the output of a wireless receiver, electrically coupling a microcontroller to the low pass filter and electrically coupling a key matrix to the microcontroller wherein the microcontroller and key matrix are comparable to a remote microcontroller and a remote key matrix of a wireless remote control device compatible with the wireless receiver, wherein input keys on the key matrix are mapped to input keys on the remote key matrix, and wherein the key matrix permits input commands to the consumer electronic device comparable to input commands available on the wireless remote control device.

DETAILED DESCRIPTION

The description that follows will be with reference to an infrared (IR) transmitter and IR receiver. One skilled in the art will appreciate that an RF transmitter and RF receiver or other wireless transmitter and receiver may be substituted for the IR transmitter and IR receiver described without varying from the scope of the method and apparatus described.

Three common modulation techniques used with IR remote control applications are 1) Amplitude Modulation (AM), On-Off Keying (OOK), 2) Frequency Shift Keying (FSK) and 3)"Pulse" Modulation. Those skilled in the art will appreciate that the choice of modulation technique does not change the scope of the methods and apparatus described herein. The oldest and simplest modulation technique is AM, OOK. With this technique, IR signals form a group of pulses within a set frequency with space separating the pulses when the signal is absent. The presence of a signal generates a pulse indicating an "ON" condition and the absence of a signal indicating an "OFF" condition. The IR receiver is tuned to a specific frequency and eliminates noise outside of this frequency with a band pass filter. Several encoding methods are available and include, Pulse Distance Encoding, Pulse Width Encoding, Pulse Position Encoding and Manchester Encoding. However, as with the type of modulation technique, the encoding method used does not change the scope of the methods and apparatus described herein. Most IR receivers of this type are three pin devices that provide a demodulated signal at logic levels that are easy to interface with a microcontroller.

Figure 1A:
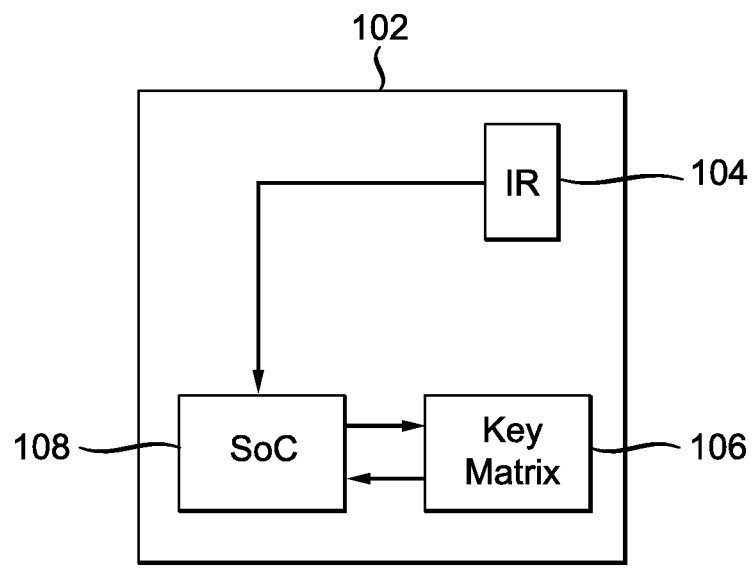
FIG. 1 illustrates four options to add a keypad to a consumer electronic device.

FIG. 1A depicts an example of a consumer electronic device with a printed circuit board (PCB) redesigned to accommodate a key matrix. PCB 102 represents the PCB of a consumer electronic device configured to receive an IR signal from an IR remote control unit. PCB 102 will include IR receiver 104 configured to receive input from an IR remote control device. IR receiver 104 communicates with an integrated circuit (IC) such as a System on a Chip (SoC) 108, which functions as a main system controller. One option to add a keypad to the consumer electronic device includes adding key matrix 106 to PCB 102. This option requires a new PCB layout to accommodate key matrix 106. The size of PCB 102 will increase as space is made for the key matrix 106. The existing physical enclosure of the consumer electronic device may require a redesign to accommodate the new PCB layout. In addition, the design requires development of key scan code for key matrix 106 to map the key or button inputs. This option demonstrates one example of adding a keypad to a consumer electronic device that requires high cost and higher level of effort.

Figure 1B:
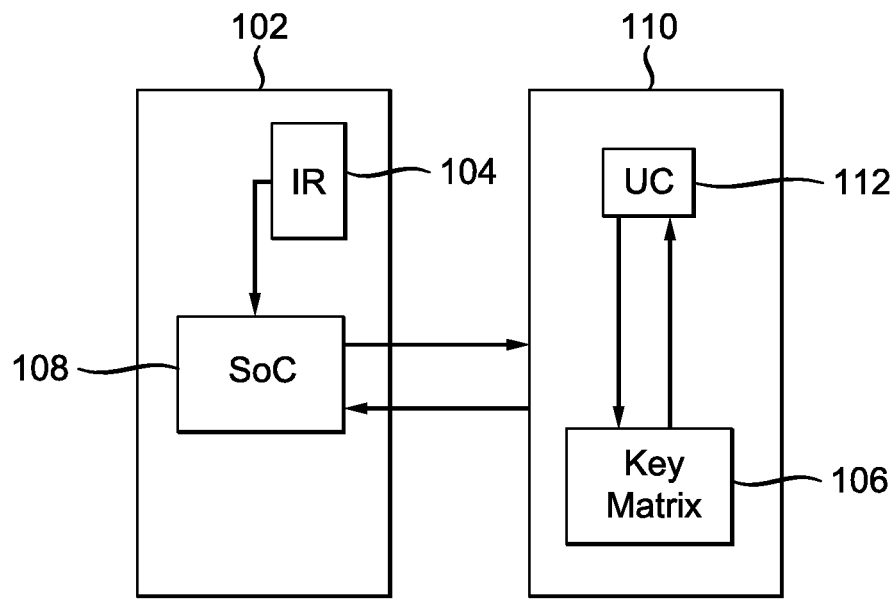

FIG. 1B depicts an example of a consumer electronic device that employs a daughter board 110 to add a keypad to the consumer electronic device. As in the previous example, the consumer electronic device includes PCB 102. The PCB 102 includes IR receiver 104 and SoC 108. SoC 108 is configured as a main system controller. In this option, daughter board 110 is used to add input keys or buttons to the consumer electronic device. The daughter board 110 includes microcontroller 112 and key matrix 106. The microcontroller 112 is configured to accept key or button inputs from key matrix 106 and is also configured to communicate with SoC 108. The daughter board 110, microcontroller 112 and key matrix 106 are relatively inexpensive components. This option, however, requires firmware development for SoC 108 to enable SoC 108 to communicate with microcontroller 112 as well as key scan code to map the key/button input of key matrix 106. Consequently, while the cost for key matrix 106, daughter board 110 and microcontroller 112 are low, the implementation effort is high due to firmware and key scan code development. Thus, this option requires a high level of effort.

Figure 1C:
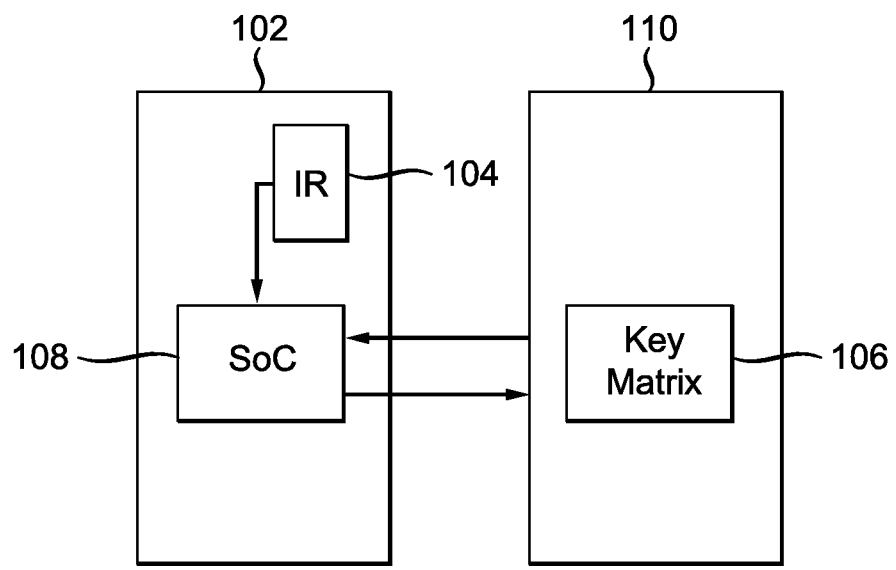

FIG. 1C depicts another example of a consumer electronic device that employs daughter board 110 to add a keypad to the consumer electronic device. In this example the daughter board includes key matrix 106. Key matrix 106 interfaces directly with SoC 108. This solution requires development of key scan code to map the key/button input of key matrix 106.

Figure 1D:
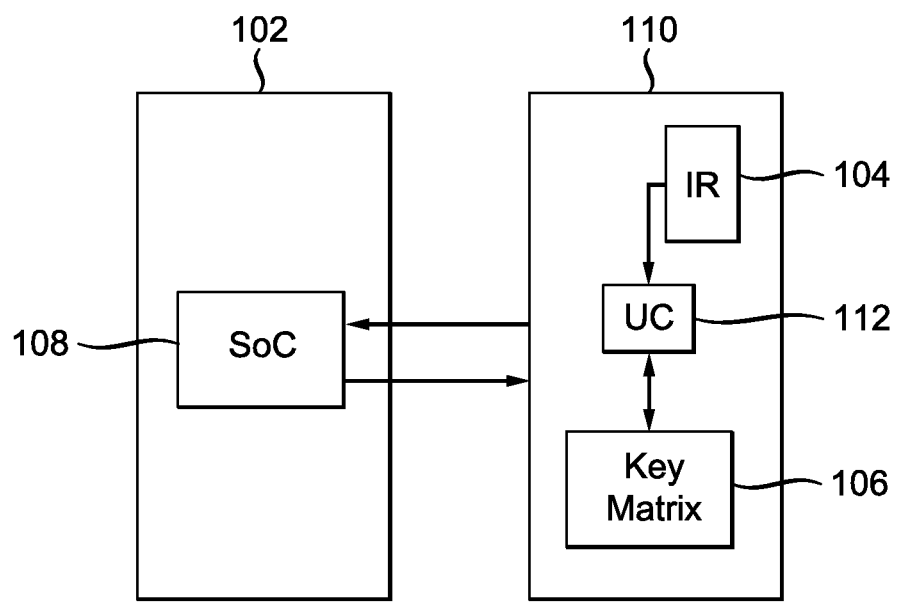

FIG. 1D depicts yet another example of a consumer electronic device that employs daughter board 110 to add a keypad to the consumer electronic device. In this example, daughter board 110 includes IR receiver 104, microcontroller 112, and key matrix 106. The communication between daughter board 110 and PCB 102 is enabled by configuring SoC 108 to communicate with microcontroller 112. In this solution, the microcontroller 112 requires programming to communicate with IR receiver 104. In addition, the development of program code to update the firmware of SoC 108 is required. Development of code for microcontroller 112 to communicate with IR receiver 104 and development of code for SoC 108 to communicate with the microcontroller 112 requires a high level of effort.

In the description that follows an SoC configured as a main system controller is illustrated for clarity. A person skilled in the art will appreciate that a variety of custom or general purpose IC's can be implemented as a main system controller using discrete and separate components. Whether an SoC or discrete and separate components are used to implement a main system controller does not change the scope of the method and apparatus described herein.

Also, as described above, the description that follows will be with reference to an IR transmitter and IR receiver. One skilled in the art will appreciate that an RF transmitter and RF receiver or other wireless transmitter and receiver can be substituted for the IR transmitter and IR receiver described without varying from the scope of the method and apparatus described.

Figure 2:
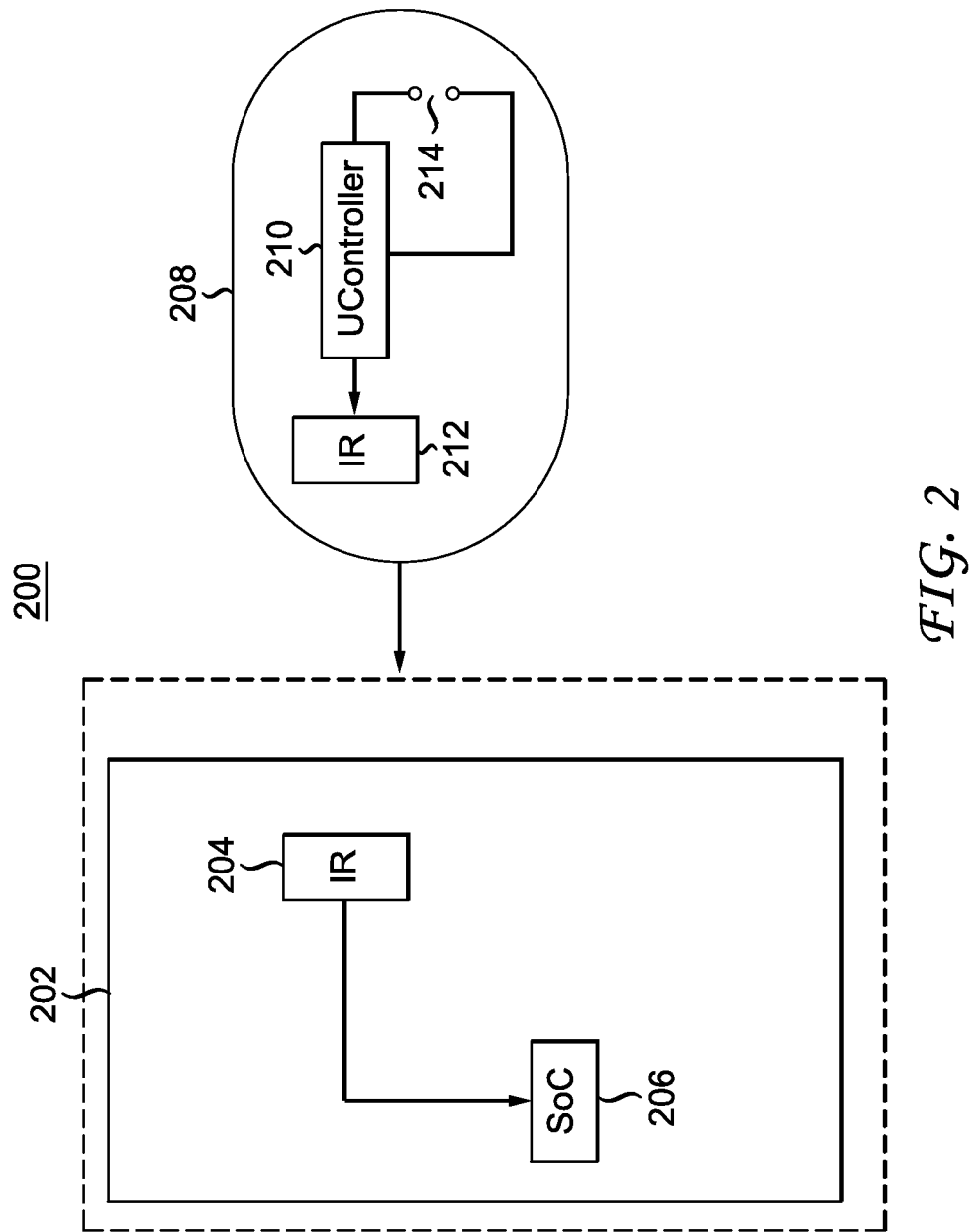
FIG. 2 illustrates a Printed Circuit Board (PCB) of a consumer electronic device configured with an IR receiver.

FIG. 2 illustrates the PCB of a consumer electronic device configured with an IR receiver. Consumer electronic device 200 includes PCB 202. PCB 202 includes SoC 206 and IR receiver 204. Those skilled in the art will appreciate that PCB 202 can be populated with other components necessary for the operation of the specific consumer electronic device. Those skilled in the art will also understand that these components can change depending on the particular device and will understand that discussion and explanation of these components is not necessary to realize and enable the method and apparatus described in the following paragraphs. IR receiver 204 is configured to receive input commands from IR remote control device 208, often referred to as an IR remote control or simply a remote control The remote control device 208 can also be incorporated into another mobile device such as a smart phone, table, laptop and the like. SoC 206 is an Integrated Circuit (IC) that functions as the main system controller. Absent from consumer electronic device 200 is a keypad or any input keys/buttons that allow input commands to be entered locally.

A user operates consumer electronic device 200 by entering input commands at IR remote control device 208. A user enters a command by making a selection on the IR remote control device 208. Information regarding the selection is detected by key matrix 214 and microcontroller 210. Microcontroller 210 comprises Input/Output (I/O) pins connected to the rows and columns or switches of key matrix 214. Microcontroller 210 applies signals to the I/O pins and senses the signals on I/O pins to detect actuation of the keys/buttons of key matrix 214. Microcontroller 210 sends the input command to IR transmitter 212, and IR transmitter 212 transmits the command to consumer electronic device 200 where IR receiver 204 demodulates the signal and sends the command to SoC 206. Key scan code maps the rows and columns of key matrix 214 to a specific input. Some consumer electronic devices can include an on-off button physically located on the device, but for others, the only way to enter a command is through an IR remote control device.

Figure 3:
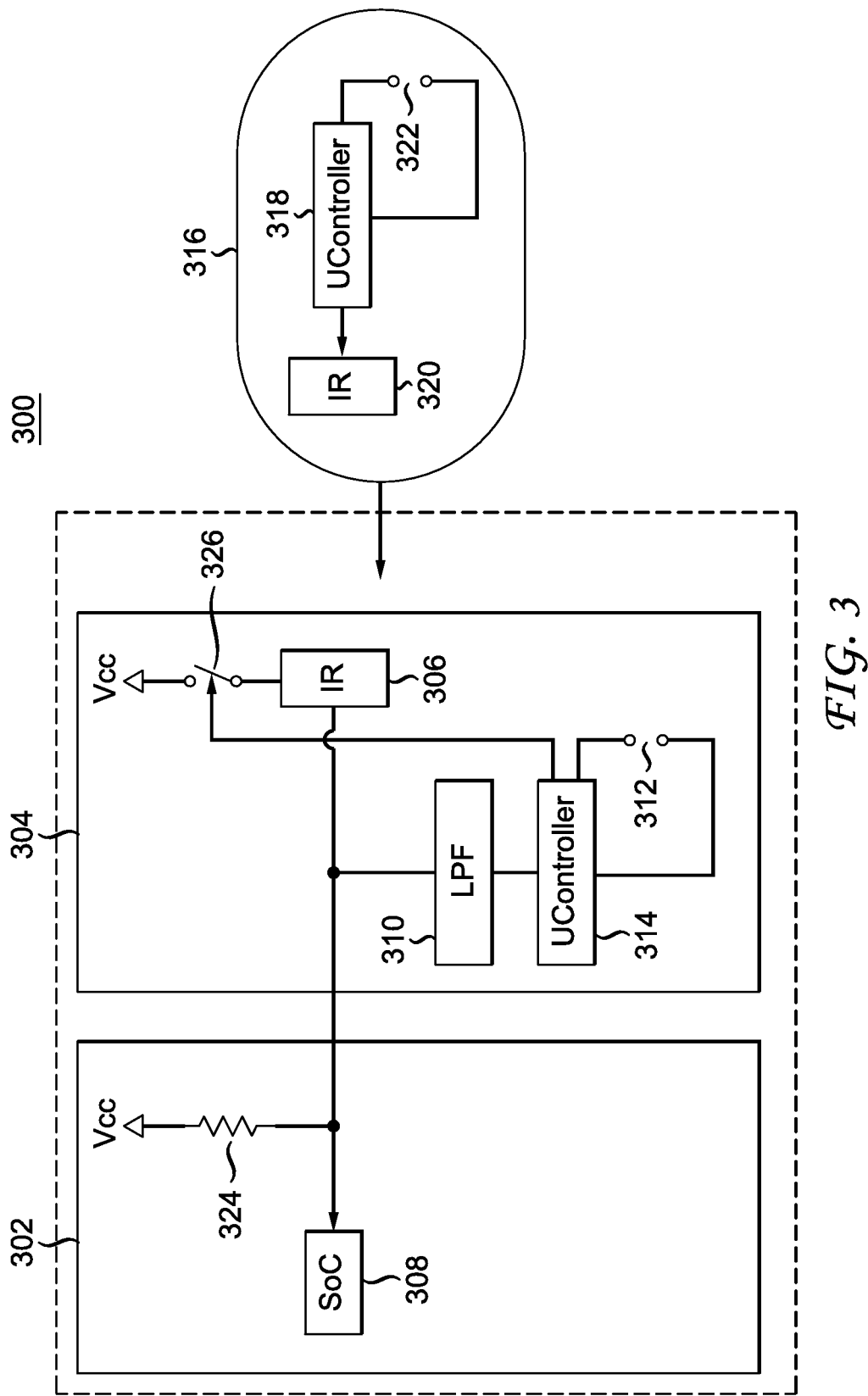
FIG. 3 illustrates a consumer electronic device with a keypad in accordance with an example embodiment of the present principles.

FIG. 3 is one non-limiting example embodiment of a consumer electronic device augmented with a keypad. Consumer electronic device 300 includes PCB 302 and System on a Chip (SoC) 308 mounted on PCB 302. Those skilled in the art will appreciate that PCB 302 can be populated with other components necessary for the operation of a specific consumer electronic device. Those skilled in the art will also understand that these components can vary depending on the particular device and will understand that discussion and explanation of these components is not necessary to realize and enable the method and apparatus described in the following paragraphs. SoC 308 is one non-limiting example of an IC that functions as the main system controller. A person skilled in the art will appreciate that a variety of custom or general purpose IC's can be implemented as a main system controller. The example illustrates IR receiver 306, low pass filter 310, microcontroller 314, and key matrix 312 mounted on daughter board 304. The electronic connection between IR receiver 306 and SoC 308 can be modified when IR receiver 306 is removed from PCB 302 and mounted on daughter board 304.

In one embodiment, IR receiver 306 is a three pin open-collector device that can optionally include external pull-up resistor 324. An IR receiver with an internal pull-up resistor can be employed as well. When IR receiver 306 is configured with an internal pull-up resistor, pull-up resistor 324 can be omitted. Low pass filter 310 is electrically coupled to the output of IR receiver 306. The output can be an open collector transistor. Low pass filter 310 is electrically coupled to microcontroller 314. Low pass filter 310 is employed to remove the Amplitude Modulation (AM) generated by microcontroller 314. Key matrix 312 is electrically coupled to microcontroller 314 and provides the input keys/buttons that allow a user to input commands directly at the consumer electronic device 300. IR remote control device 316 is a device compatible with consumer electronic device 300. IR remote control device 316 includes IR transmitter 320, microcontroller 318, and key matrix 322. IR remote control device 316 is compatible with consumer electronic device 300 and selection commands are mapped to enable a user to operate consumer electronic device 300 with remote control device 316. In this non-limiting example embodiment, microcontroller 314 is selected based on microcontroller 318, and key matrix 312 is selected based on key matrix 322. Thus, microcontroller 314 is a component comparable to microcontroller 318 and key matrix 312 is a component comparable to key matrix 322.

The benefits of using microcontroller 314 and key matrix 312 comparable to microcontroller 318 and key matrix 322 will become apparent with the following description. Using microcontroller 314 comparable to microcontroller 318 and key matrix 312 comparable to key matrix 322 simplifies development of daughter board 304 and eliminates the need for firmware and key scan code development. The firmware in SoC 308 is configured to communicate with microcontroller 318; therefore, SoC 308 can communicate with microcontroller 314 because microcontroller 314 is comparable to microcontroller 318 and no further changes are necessitated. In addition, since key matrix 312 is comparable to key matrix 322, the same key scan code can be used. In other words, keypad mapping is the same and does not require any further develop or changes. The selections for input functions, such as power on/off, volume up/down, channel/track, and the like, on daughter board 304 will be the same as the selections on IR remote control device 316. The components used to populate daughter board 304 and add a keypad to the consumer electronic device 300 are inexpensive components. Additionally, using a comparable microcontroller 314 and comparable key matrix 312 enable an implementation with low effort and development time in addition to low cost.

As illustrated in FIG. 3, in one non-limiting embodiment, microcontroller 314 mounted on daughter board 304 can be configured to disable IR receiver 306 for a preset time period when microcontroller 314 detects a selection at key matrix 312. Microcontroller 314 can be electrically coupled to switch 326 and programmed to disable or switch off IR receiver 306 for a preset time period upon detection of a selection at key matrix 312. Disabling IR receiver 306 for a preset time interval can reduce the possibility of interference from an external source.

Figure 4:
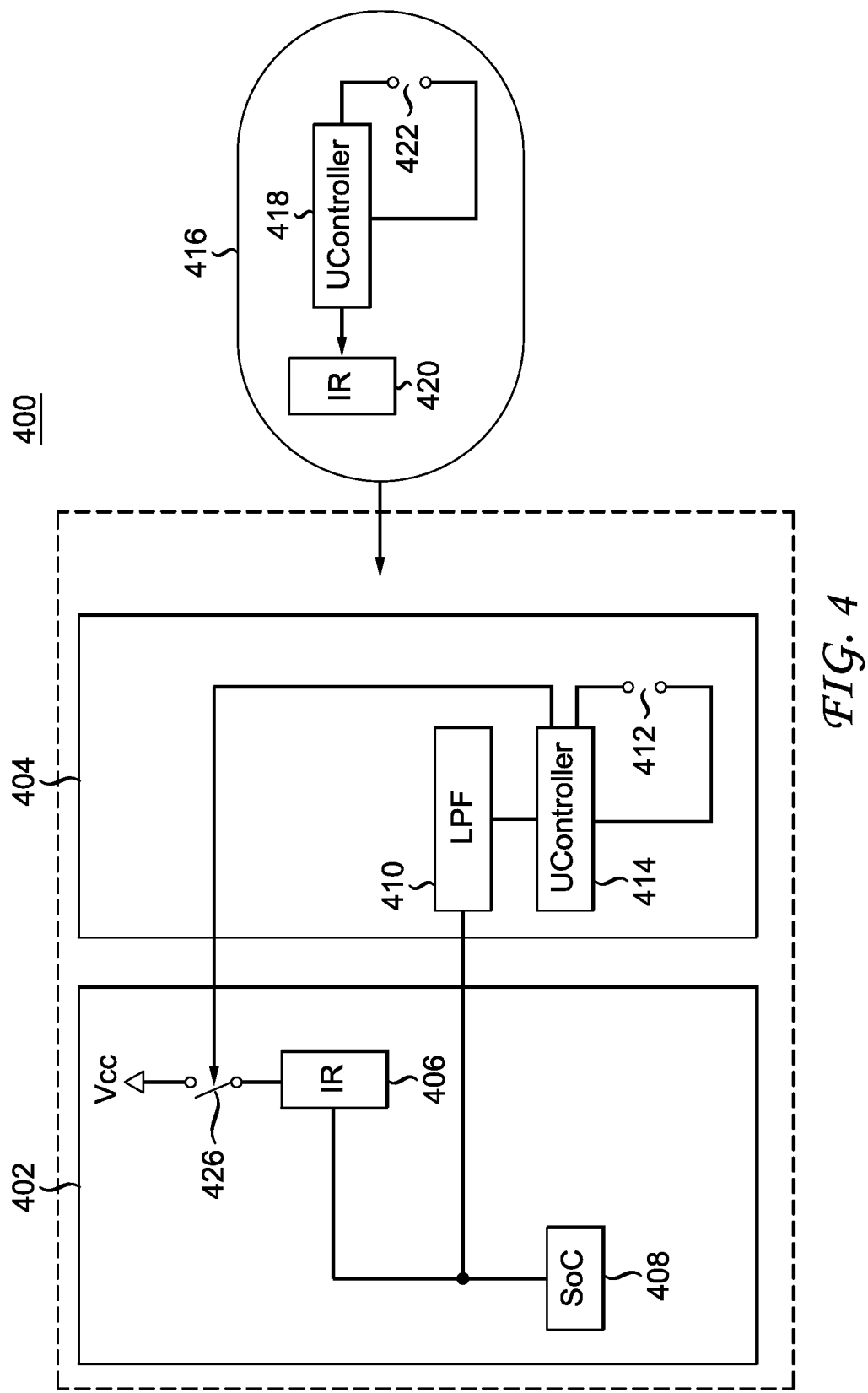
FIG. 4 illustrates a consumer electronic device with a keypad in accordance with another example embodiment of the present principles.

FIG. 4 is another non-limiting example embodiment of a consumer electronic device augmented with a keypad. Consumer electronic device 400 includes PCB 402. PCB 402 includes IR receiver 406 and SoC 408. As explained previously, those skilled in the art will appreciate that PCB 402 is populated with other components necessary for the operation of a specific consumer electronic device. Those skilled in the art will also understand that these components can change depending on the particular device and will understand that discussion and explanation of these other components is not necessary to realize and enable the method and apparatus described herein. SoC 408 is one non-limiting example of an IC that functions as a main system controller. A person skilled in the art will appreciate that a variety of custom or general purpose IC's can be implemented as a main system controller. This example illustrates an embodiment where IR receiver 406 remains on PCB 402.

In one embodiment, IR receiver 406 is a three pin open-collector with an internal pull-up resistor. An external pull-up resistor such as pull-up resistor 324 illustrated in FIG. 3 can be employed as well. Low pass filter 410 is electrically coupled to the output of IR receiver 406. The output can be an open collector transistor. Low pass filter 410 is electrically coupled to microcontroller 414. Low pass filter 410 is employed to remove the Amplitude Modulation (AM) of microcontroller 414. Key matrix 412 is electrically coupled to microcontroller 414 and provides the input selections that allow a user to input commands at consumer electronic device 400. IR remote control device 416 is a device compatible with the consumer electronic device 400. IR remote control device 416 includes IR transmitter 420, microcontroller 418, and key matrix 422. In this non-limiting example embodiment, microcontroller 414 is selected based on microcontroller 418 and key matrix 412 is selected based on key matrix 422. Accordingly, microcontroller 414 is a component comparable to microcontroller 418 and key matrix 412 is a component comparable to key matrix 422.

As explained with respect to FIG. 3, using microcontroller 414 comparable to microcontroller 418 and key matrix 412 comparable to key matrix 422 simplifies development of daughter board 404 and eliminates the need for firmware and key scan code development. The firmware in SoC 408 is configured to communicate with microcontroller 418; therefore, SoC 408 will communicate with microcontroller 414 because microcontroller 414 is comparable to microcontroller 418. In addition, since key matrix 412 is comparable to key matrix 422 the same key scan code can be used. In other words, the key mapping is the same. The keys/buttons for input functions on daughter board 404, such as power on/off, volume up/down, channel/track, will be the same as the keys/buttons on IR remote control device 416. The components used to populate daughter board 404 and add a keypad to the consumer electronic device 400 are inexpensive components, and using a comparable microcontroller 414 and comparable key matrix 412 enable an implementation with little effort.

A daughter board such as daughter board 304 or daughter board 404 as illustrated in FIG. 3 and FIG. 4 respectfully can be designed to fit a front panel of a consumer electronic device. Designing a daughter board PCB to fit the front panel of a consumer electronic device will permit reuse of the top, bottom, rear and side panels of the device. The daughter board can also be designed to fit into the top or side panels of the device. The IR receiver, however, is normally installed in the front panel of a consumer electronic device so that it is positioned for optimum reception of the IR signal transmitted from the remote control device. Consequently, most manufactures of the consumer electronic devices can desire to mount the daughter board in the front panel of the consumer electronic device. Whether a manufacturer decides to mount the daughter board on the front panel, top panel, or side panels, the remaining panels (enclosure) can still be used resulting in minimal cost and effort to add a keypad to the consumer electronic device.

Example embodiments of the present principles provide a method of adding a keypad to a consumer electronic device configured with a wireless receiver, the method comprising, electrically coupling a low pass filter to the output of the wireless receiver, electrically coupling a microcontroller to the low pass filter, and electrically coupling a key matrix to the microcontroller wherein the microcontroller and key matrix are comparable to a remote microcontroller and a remote key matrix of a wireless remote control device compatible with the wireless receiver, wherein input keys on the key matrix are mapped to input keys on the remote key matrix, and wherein the key matrix permits input commands to the consumer electronic device comparable to input commands available on the wireless remote control device.

In another embodiment, a consumer electronic device configured with a wireless receiver includes a low pass filter electrically coupled to the output of the wireless receiver, a microcontroller electrically coupled to the low pass filter, and a key matrix electrically coupled to the microcontroller wherein the microcontroller and key matrix are comparable to a remote microcontroller and a remote key matrix of a wireless remote control device compatible with the wireless receiver, wherein input keys on the key matrix are mapped to input keys on the remote key matrix, and wherein the key matrix permits input commands to the consumer electronic device comparable to input commands available on the wireless remote control device.

Examples of a consumer electronic device configured with a wireless remote control receiver include: television receivers such as cable or satellite set-top boxes, audio receivers, DVD players, digital music players, video recorders, video players and cameras. In addition, many home and household appliances can be configured with a wireless remote control receiver. It should be apparent that the method and apparatus described can be applicable to all of these devices. It should also be appreciated that the methods and apparatus described can be applied to virtually any consumer electronic device configured with a wireless receiver that does not offer a physical structure on the device to input commands.

In one aspect of the method and consumer electronic device described, when the microcontroller detects an input at the key matrix, the microcontroller disables the wireless receiver for a preset period of time.

In another aspect of the method and consumer electronic device, the output of the wireless receiver is an open collector transistor.

In yet another aspect of the method and consumer electronic device, the wireless receiver comprises an external pull-up resistor.

As used in this application, the term "circuitry" refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile device or server, to perform various functions; and (c) circuits, such as a microprocessor(s) or a portion of a microprocessor(s), that require software or firmware for operation, even if the software or firmware is not physically present. This definition of "circuitry" applies to all uses of the term in this application, including in any claims. As a further example, as used in this application, the term "circuitry" would also cover an implementation of merely a processor (or multiple processors) or portion of a processor and its (or their) accompanying software and/or firmware. The term "circuitry" also would cover, if applicable to the particular claim element, a baseband integrated circuit, or applications processor integrated circuit, for a mobile phone or a similar integrated circuit in server, a cellular network device, or other network device.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art; additionally, in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs) as well as unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The foregoing description should therefore be considered as merely illustrative of the present principles, teachings and example embodiments, and not in limitation thereof.

Further, some of the various features of the above non-limiting embodiments may be used to advantage without the corresponding use of other described features. While the present principles have been described in conjunction with specific embodiments, one of ordinary skill in the art appreciates that there are many variations that are in accordance with the foregoing description and remain within the scope of the appended claim set. All of the features described above or shown in the drawings can be advantageously combined with one another within the framework of the present principles. Accordingly, it is intended that the present principles embrace all such alternatives, modifications and variations as fall within the scope of the appended claims.

The invention claimed is:

1. A device, wherein said device is configured to receive user input commands from a wireless remote control, said wireless remote control comprising a wireless transmitter, a first microcontroller, a first key matrix, and first input keys, said first microcontroller being configured to convert said user input commands received via said first key matrix from said first input keys to amplitude modulated control commands, said wireless transmitter being configured to wirelessly transmit said amplitude modulated control commands to said device, said device comprising a wireless receiver electrically coupled to said device for controlling said device through control commands received from said wireless remote control, said device further comprising:

second input keys;
a second key matrix;
a second microcontroller configured to convert user input commands, received from said second input keys via said second key matrix, to amplitude modulated control commands;
a low-pass filter configured to remove amplitude modulation from said amplitude modulated control commands received from said second microcontroller and electrically coupled to said device for controlling said device through said second input keys; and wherein said second microcontroller is configured to disable said wireless receiver for a preset period of time when detecting input from said second input keys.

2. The device of claim 1, wherein said second key matrix is configured to transmit same key scan codes to said second microcontroller for local selections of functions of said device via said second input keys as key scan codes transmitted by said first key matrix to said first microcontroller for remote selections of same functions of said device via said first input keys.

3. The device of claim 2, wherein said same functions are selected from a group comprising: power on, power off, volume up, volume down, channel, track.

4. The device of claim 1, wherein said second microcontroller, said second key matrix and said low pass filter are mounted on a daughter printed circuit board that is configured to be electrically connected to a mother printed circuit board configured to comprise a main system controller.

5. The device of claim 4, wherein said wireless receiver is mounted on said mother printed circuit board.

6. The device of claim 4, wherein said daughter printed circuit board comprises said wireless receiver and said daughter printed circuit board is configured to be fitted to a front panel of the device.

7. The device of claim 4, wherein said daughter printed circuit board is configured to be fitted to a panel of an enclosure of said device selected from the following group: a front panel, a side panel, a top panel.

8. The device of claim 1, wherein said wireless transmitter and said wireless receiver are configured for infrared wireless transmission respectively infrared wireless reception.

9. The device of claim 1, wherein said wireless transmitter and said wireless receiver are configured for Radio Frequency transmission respectively Radio Frequency reception.

10. The device of claim 1, wherein the device is selected from a group consisting of a set-top box, a television, a digital music player, a video recorder, a video player, a camera and a household appliance.

* * * * *